Nov. 5, 1968  J. D. LAYTON  3,409,311
TRANSPORT APPARATUS FOR TOWING A VEHICLE
Filed July 15, 1966
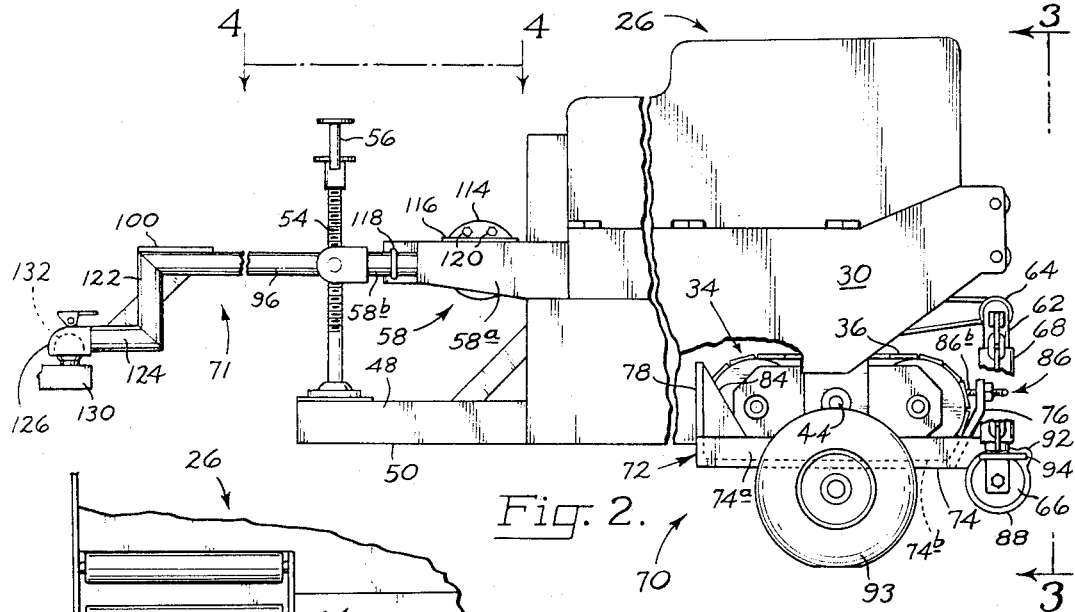
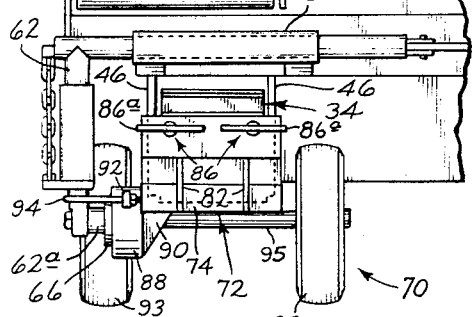
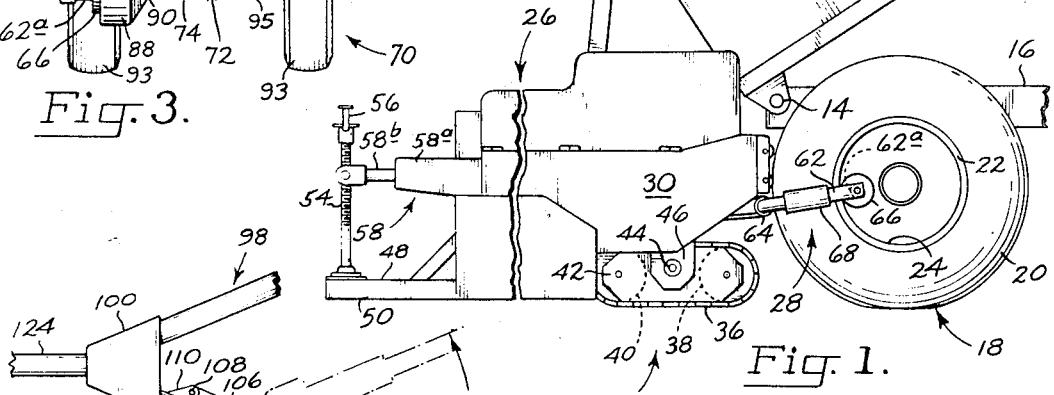
Jack D. Layton
INVENTOR
BY Kolisch + Hartwell
Attys.

United States Patent Office 3,409,311
Patented Nov. 5, 1968

3,409,311
TRANSPORT APPARATUS FOR TOWING
A VEHICLE
Jack D. Layton, 4725 Turner Road,
Salem, Oreg. 97302
Filed July 15, 1966, Ser. No. 565,600
6 Claims. (Cl. 280—415)

ABSTRACT OF THE DISCLOSURE

Apparatus for towing a vehicle such as a spreader which includes a screed adjacent its rear end and ground-traveling support means supporting the forward end of the spreader. The apparatus includes a detachable tow bar which is detachably connected to the spreader at points disposed above the screed and spaced laterally toward opposite sides of the spreader. The tow bar extends rearwardly over the screed and in operative position is coupled to the rear end of the towing vehicle. When so coupled, the tow bar holds the screed elevated from the ground and the spreader is in condition to be towed backwardly by the towing vehicle. A wheeled transport means is provided under the ground-traveling support means in the spreader, which elevated the forward end of the spreader.

---

This invention relates to transport apparatus for a towed vehicle, and more specifically, to such apparatus which is adapted to support a towed vehicle above the ground, and enable transport of the same from one location to another.

In a specific and preferred embodiment of the invention, the transport apparatus is adapted to be used with a towed vehicle of the kind employed to distribute paving aggregate on the ground. Such a vehicle may comprise a wheel or track-supported spreader including a spreader box and a screed mounted adjacent the rear of the spreader box. During paving, the spreader is towed forwardly over the ground by a dump truck, and spreads aggregate on the ground while being supported both by the wheels (or tracks) and by the trailing screed. The screed moves over the top of the aggregate, leveling it to produce a smooth paved surface.

When the spreader is to be moved from one location to another, for example between different paving operations, it is customary to connect it to the rear of the dump body of a dump truck with the dump body raised, and then to raise the spreader entirely from the ground by lowering the dump body. This mode of preparing the spreader for transport cannot be used, however, where a dump truck is not available, or where the size of the dump truck is such that it is not capable of lifting the mass of the spreader. Accordingly, this invention has to do with preparing such a spreader for transport by means whereby the spreader may be towed behind a vehicle.

A general object of the present invention is to provide novel apparatus for preparing a vehicle such as a spreader for towing over the ground at highway speeds.

More specifically, an object of the invention is to provide such apparatus which includes, in operative position, transport means detachably mounted on the vehicle's ground-traveling support devices (wheels or tracks), supporting the devices and the vehicle in an elevated position for movement over the ground. According to the invention, the transport means comprises a holder for each of the vehicle's support devices, a wheel mounted on each holder supporting the same in an elevated position, and clamping means mounted on each holder for clamping the device in place.

The wheels or tracks (support devices) of a vehicle such as a spreader are usually mounted for rotation about an axis extending transversely of the vehicle. With the transport means in operative position, in order to assure proper towing of the vehicle and to avoid wobbling when it is transported, it is necessary to inhibit rotational movement of the support devices about such an axis. Accordingly, a further object of the invention is to provide apparatus of the type described wherein the transport means further comprises means for releasably receiving and holding portions of the towed vehicle at a point spaced from the rotational axis of the vehicle support devices, thereby preventing rotational movement of the transport means about such axis.

Another object of the invention is to provide such apparatus which further includes a tow bar, in operative position detachably mounted on portions of the vehicle enabling connection to a wide variety of towing vehicles. With a spreader, the tow bar extends from the end of the spreader where the screed is located, which is the rear end of the spreader with the spreader operating to lay paving material, so that the spreader when transported between jobs moves backwardly over the highway.

Yet another object is to provide such apparatus which is relatively easy to use, and which may quickly be mounted on or detached from a vehicle.

These and other objects and advantages attained by the present invention will become more fully apparent as the description which follows is read in conjunction with the accompanying drawings, wherein:

FIG. 1 is a partial side elevation illustrating a spreader connected to rear portions of a dump truck, as done when laying paving material;

FIG. 2 is an enlarged side elevation of the spreader of FIG. 1 with the dump truck disconnected, and illustrating transport apparatus as contemplated herein mounted in operative position on the spreader;

FIG. 3 is a partial end elevation, taken along the line 3–3 in FIG. 2; and

FIG. 4 is a partial top plan view, taken along the line 4–4 in FIG. 2.

Turning now to the drawings, and with reference first to FIG. 1, shown generally at 10 is the rear portion of the usual dump truck, including a dump body 12 pivotally mounted at 14 to a truck frame 16. Supporting the dump truck for movement over the ground are rear, lateral support wheel assemblies 18, one being provided on each side of the truck. In the usual instance, each wheel assembly may include dual wheels comprising a pair of outer pneumatic tires 20 (only one of which is shown in FIG. 1) mounted on rims, such as rim 22, which are in turn suitably mounted for rotation on the truck frame. In such construction, an annular surface, such as surface 24 is presented around the inside of the outer rim of each wheel assembly.

Indicated generally at 26 in FIG. 1 is a vehicle taking the form of a spreader for paving aggregate. The spreader is connected to the dump truck by draft means, such as that shown generally at 28, enabling the spreader to be moved forwardly (to the right in FIG. 1) during a paving operation.

Considering the construction of spreader 26 in somewhat more detail, it comprises the usual frame and a spreader box or hopper 30 mounted on this frame. The hopper is adapted to receive paving aggregate which is dumped from the rear of dump body 12, and to distribute the same on the ground through a suitable opening (not illustrated) located adjacent the bottom of the hopper.

Adjacent the forward end of the spreader, and located on either side thereof, are ground-traveling support devices, such as the one indicated at 34. These two devices are also referred to herein collectively as ground-traveling support means. Each device comprises a continuous track 36 trained over wheels 38, 40, which are journaled on a mounting 42. Each mounting 42 is pivotally mounted as shown at 44 on legs, such as leg 46, extending downwardly from the frame of the spreader. Pivotal mountings 44 enable the support devices to rotate about an axis extending transversely of the spreader.

Adjacent the rear end of spreader 26, and extending transversely thereof, is a screed 48 comprising a substantially horizontal, flat plate 50. The plate functions during paving to slide over aggregate flowing from the spreader and to smooth and level out the same.

The screed is connected at its forward end to the spreader frame through a pivot connection (not shown) enabling the screed to assume various angular positions relative to the base of the spreader, thereby to control the thickness of aggregate laid on the ground. Mechanism is included on opposite sides of the spreader for adjusting the position of screed 48, comprising screw-operated extensible mechanisms, such as the one shown at 54, and hand wheels, such as wheel 56, which are connected to the mechanisms and used to adjust the same. Each mechanism is mounted on the rear end of a rearwardly extending post assembly 58, comprising a rearwardly extending support arm 58a mounted on the spreader frame, and a cylindrical part 58b mounted on the rear of the arm.

Considering the construction of previously mentioned draft means 28, it may comprise a pair of elongated draft arms, such as arm 62, provided on either side of the spreader, which extend forwardly from the front of the spreader and have inturned end portions 62a adjacent forward extremities thereof. Each arm is pivotally mounted on the spreader frame by pivot means 64 pivoting the rear end of the arm. Journaled on the inturned ends of these arms are rollers, such as roller 66, which are adapted to ride on inner annular surfaces 24 of the wheel rims. Sleeves 68 are journaled on the arms where they extend across the sides of the tires, and these sleeves provide rolling contact between the sides of the arms and the tires on movement of truck 10.

Means (not shown) may be provided on the spreader for bringing the opposed draft arms on either side thereof inwardly toward each other, whereby they may be properly positioned with their rollers riding on the annular surfaces of the wheel rims. To disconnect the spreader from the dump truck, the arms may be shifted laterally outwardly from the wheel rims.

As used herein, "ends" of the spreader refer to the forward and rear extremities of the spreader as related to the direction in which the spreader moves when performing a paving operation, and the "sides" of the spreader refer to the extremities on either side of such forward and rear ends. Similarly, when reference is made to a "longitudinal" direction, such refers to a direction extending between forward and rear extremities, and when reference is made to a "transverse" direction, such refers to a direction extending between the sides of the spreader.

When it is desired to transport spreader 26 from one location to another between paving jobs, and at highway speed, transport apparatus as contemplated herein may be employed, as illustrated in FIGS. 2 through 4. The transport apparatus shown includes transport means comprising a pair of transport dollies, such as the one indicated at 70 (FIGS. 2 and 3), each of which is adapted to be detachably mounted under one of the spreader's support devices 34, and a tow bar 71 (FIGS. 2 and 4), adapted to be detachably mounted on what normally are rear portions of the spreader.

Considering first the construction and mounting of a transport dolly 70, and with reference to FIGS. 2 and 3, it comprises a holder 72 for receiving and holding one of the spreader's support devices 34. The holder includes an elongated, rectangular, substantially horizontal tray 74 extending between forward and rear ends or longitudinally of the spreader. Tray 74 has upright side portions 74a which project above the top surface of a bottom 74b. Side portions 74a of the tray function, with a vehicle support device held in the holder, to prevent the device from shifting laterally off the tray. The holder also includes a pair of substantially upright guards or plates 76, 78 suitably joined to the tray adjacent its rear and forward ends, respectively. Plates 76, 78 extend transversely across the width of the tray, and are braced by pairs of gussets, such as those shown at 82, 84, which are fastened as by welding between the plates and the tray.

Suitably mounted on plate 76 is a pair of screw-operated clamps 86, also referred to herein as clamping means, including operating handles 86a (FIG. 2), and forward portions 86b (FIG. 2) which extend through the plate. The clamps are adapted to hold in place a support device received in a holder by clamping the device against plate 78 at the front of the tray.

Mounted adjacent the rear end of each tray is a substantially cylindrical, outwardly facing, open cup, such as cup 88, supported by a gusset 90 (FIG. 3) which is fastened as by welding between the bottom of the tray and the cup. Cups 88 are adapted freely to receive previously-mentioned rollers 66 which are mounted on the ends of draft arms 62. Cups 88 are also referred to herein as receiving and holding means. Mounted on the outside wall of each cup 88 is a projecting ear, such as ear 92.

Each transport dolly further includes a pair of laterally-spaced support wheels 93 suitably mounted on the bottom of holder 72 through axle 95 for rotation about an axis extending transversely of the holder. The wheels support the holder of the transport dolly in an elevated position for movement over the ground.

In FIGS. 2 and 3, transport dolly 70 is shown mounted in operative position under a support device of the spreader. The support device rests on the bottom of tray 74, and is held firmly in place by clamps 86 which clamp it tightly against plate 78. One of the draft arms 62 depends from pivot connection 64 on the spreader, and roller 66 on the end of the arm is freely received in cup 88. To hold the arm in proper position, whereby the roller remains seated within the cup, a J-shaped bolt 94 hooks around the arm and is suitably connected to previously-mentioned ear 92 on the cup.

Turning now to a description of the construction and mounting of tow bar 71, and referring to FIGS. 2 and 4, the tow bar comprises a pair of elongated arms 96, 98 which have their forward ends suitably fastened to a connector 100, and which diverge from one another progressing toward their rear ends. Arm 98 is formed as a single piece. Arm 96 includes a pair of elongated members 96a, 96b, which are pivoted together through pivot connection 102. This pivot connection enables member 96b of arm 96 to swing back and forth relative to arm 98.

A collar 104 is slidably mounted on arm 96, and is adapted to prevent swinging of member 96b of the arm when the collar is moved to a position (shown in solid outline) where it encloses pivot connection 102. When the collar is slid rearwardly along the arm to the position shown in dashed outline at 104A, member 96b may be swung about pivot connection 102 to collapse the tow bar structure when not in use.

An elongated finger 106 is mounted on and extends forwardly of collar 104. With the collar in the position where it is shown in solid outline, finger 106 is adapted to be releasably locked as by a pin 108 to an ear 110 which is suitably mounted on member 96a of arm 96. With finger 106 and ear 110 locked together, the collar is held in place and arm 96 remains rigid along its entire length.

Considering the means provided for connecting tow bar 71 to the spreader, annular mounting rings, such as the one shown at 112 (FIG. 4), are suitably joined to the rear ends of arms 96, 98. Each of these rings is provided with circumferentially distributed bolt holes (not shown) which are adapted to match with holes in a similar annular ring 114 suitably joined to a bracket 116, which is detachably mounted on a post assembly 58 of the spreader. The bracket is held on the post assembly by means of a clamp 118 which connects the bracket to part 58b of the assembly, and by suitable bolts (not illustrated) which connect the bracket to an arm 58a of the assembly. Rings 112, 114 may be detachably connected together by means of nut and bolt assemblies, such as those shown at 120.

The mounting for the rear end of arm 98 on the spreader is similar to that shown for the rear end of arm 96. With the rear ends of arms 96, 98 so connected to post assemblies 58 located on opposite sides of the spreader and above the screed, the detachable connection which is established with the spreader is at laterally spaced points disposed about the screed and spaced laterally adjacent opposite sides of the spreader.

The tow bar further includes a downwardly projecting member 122 (FIG. 2) mounted on connector 100 adjacent the forward ends of arms 96, 98 and substantially at right angles to the arms. Suitably joined to the bottom of member 122 is a forwardly extending elongated arm 124, on the forward end of which is suitably mounted a trailer hitch coupling 126.

In FIGS. 2 and 4, tow bar 71 is shown mounted in operative position on the spreader where it extends from the rear end of the spreader or the end where the screed is located. The forward end of its tow bar is shown connected to the rear of a suitable towing vehicle, such as portion 130 at the rear of a pick-up truck, through ball 132 to which is attached hitch coupling 126.

Considering now how the transport apparatus described may be used, and assuming that initially the apparatus is detached from the spreader and the spreader disconnected from the dump truck, when it is desired to mount the apparatus the spreader is jacked up at its forward end, first adjacent one side and then adjacent its opposite side, and transport dollies 70 are mounted in turn under the two support devices normally supporting the spreader. Clamps 86 are then tightened against the support devices and draft arms 62 are positioned so that rollers 66 are received in cups 88. J-bolts 94 are then fastened to ears 92 on the cups to hold the draft arms and rollers in place. It will be noted that the rollers are received and held in the cups at a point spaced from the rotational axis provided by pivot connections 44 for the support devices. This assures that no rotational movement, either of devices 34 or of holders 72, can occur about this axis.

Tow bar 71 is mounted on the rear of the spreader through bracket 116 described. The pair of rings 112, 114 described in connection with an arm of the tow bar structure permit fixing the arms in positions best facilitating connection of the forward end of the tow bar to a towing vehicle. The forward end of the tow bar may then be connected to a towing vehicle through the hitch coupling. With such done the spreader is in condition to be towed at highway speed, while supported through wheels 93, and while being towed backwardly.

With the transport apparatus contemplated, the spreader is held above the ground with screed 48 well clear of the ground. The weight of the rear portions of the spreader, including the screed, is suspended between the transport means which support one end of the spreader and the rear of the towing vehicle to which the tow bar structure is attached.

It should be apparent that the apparatus permits a relatively wide variety of towing vehicles to be used in the transport of the spreader or other trailer coupling.

While an embodiment of the invention has been described, changes and variations are possible without departing therefrom. It is desired to cover all such modifications and variations as would be apparent to one skilled in the art, and that come within the scope of the appended claims.

It is claimed and desired to secure by Letters Patent:

1. The apparatus of claim 5, wherein said ground-traveling support means of the spreader includes a device mounted for rotation about an axis extending transversely of the spreader, the spreader has an elongated draft arm adjacent its forward end, one end of the draft arm is journaled on the spreader and an opposite free end of the draft arm is swingable in an arc, and the detachable transport means includes means located at a point spaced from said axis releasably receiving and holding said free end of said draft arm with the draft arm thus inhibiting rotation of said device and said transport means about said axis.

2. The apparatus of claim 1, wherein a roller is mounted on said free end of said draft arm, and said receiving and holding means comprises a laterally outwardly facing cup adapted to receive said roller.

3. Apparatus for towing a spreader where such spreader comprises a hopper located adjacent the forward end of the spreader adapted to receive aggregate dumped from a dump truck, a screed rearwardly of the hopper for leveling material flowing from the hopper, and ground-traveling support means forwardly of the screed normally supporting the forward end of the spreader during a paving operation, the apparatus comprising, in operative position, an elongated tow bar detachably connected to the spreader and extending rearwardly over the screed in the spreader, said tow bar having an end remote from the spreader located rearwardly of the screed releasably connected to the rear of the towing vehicle whereby such vehicle on moving forwardly tows the spreader backwardly, said tow bar supporting the spreader where it extends rearwardly from the spreader's ground-traveling support means in an elevated position whereby the screed which is beneath the tow bar is elevated from the ground.

4. The apparatus of claim 3, wherein said tow bar is detachably connected to the spreader at points elevated above the screed and spaced laterally toward opposite sides of the spreader.

5. The apparatus of claim 3 which further includes detachable transport means detachably mounted under said ground-traveling support means of the spreader, said transport means supporting said ground-traveling support means and the forward end of the spreader above the ground.

6. The apparatus of claim 5, wherein the ground-traveling support means of the spreader comprises a pair of ground-traveling support devices disposed adjacent opposite sides of the spreader, and said transport means comprises a transport dolly provided for each ground-traveling support device, each dolling comprising a holder for receiving and holding a support device and wheel means supporting the holder for movement over the ground, said holder comprising an elongated tray extending longitudinally of the spreader, a pair of substantially upright guards mounted on said tray adjacent its ends inhibiting forward and rearward movement of a support device relative to the holder, and clamping means mounted on one of said guards operable to clamp against a ground-traveling support device received within the holder.

References Cited

UNITED STATES PATENTS

| | | | |
|---|---|---|---|
| 2,391,503 | 12/1945 | Page | 280—402 X |
| 2,776,063 | 1/1957 | Larson | 214—334 |
| 3,145,860 | 8/1964 | Graves | 214—334 |
| 3,147,871 | 9/1964 | Rogers | 214—506 |
| 3,275,342 | 9/1966 | Layton | 280—460 |
| 3,300,234 | 1/1967 | Layton | 280—460 |

FOREIGN PATENTS 1,358,219   3/1964   France.

LEO FRIAGLIA, *Primary Examiner.*

UNITED STATES PATENT OFFICE
CERTIFICATE OF CORRECTION

Patent No. 3,409,311                                                November 5, 1968

Jack D. Layton

It is certified that error appears in the above identified patent and that said Letters Patent are hereby corrected as shown below:

Column 5, line 75, "1." should read -- 5. --; same line 75 claim reference numeral "5" should read -- 3 --. Column 6, line 12, "2." should read -- 6. --; same line 12, claim reference numeral "1" should read -- 5 --; line 16, "3." should read -- 1 --; line 34, "4." should read -- 2. --; same line 34, claim reference numeral "3" should read -- 1 --; line 38, "5." should read -- 3. --; same line 38, claim reference numeral "3" should read -- 1 --; line 44, "6." should read -- 4. --; same line 44, claim reference numeral "5" should read -- 3 --.

Signed and sealed this 10th day of March 1970.

(SEAL)
Attest:

EDWARD M. FLETCHER,JR.                          WILLIAM E. SCHUYLER, JR
Attesting Officer                                   Commissioner of Patents